United States Patent
Butzmann et al.

(10) Patent No.: US 9,160,181 B2
(45) Date of Patent: Oct. 13, 2015

(54) ENERGY STORAGE SYSTEM AND METHOD FOR OPERATING SAME

(75) Inventors: Stefan Butzmann, Beilstein (DE); Holger Fink, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 661 days.

(21) Appl. No.: 13/516,569

(22) PCT Filed: Oct. 28, 2010

(86) PCT No.: PCT/EP2010/066311
§ 371 (c)(1),
(2), (4) Date: Aug. 24, 2012

(87) PCT Pub. No.: WO2011/082856
PCT Pub. Date: Jul. 14, 2011

(65) Prior Publication Data
US 2012/0306468 A1    Dec. 6, 2012

(30) Foreign Application Priority Data
Dec. 17, 2009  (DE) .......................... 10 2009 054 820

(51) Int. Cl.
*H02J 7/00*  (2006.01)
*H02J 7/14*  (2006.01)

(52) U.S. Cl.
CPC ............. *H02J 7/0024* (2013.01); *H02J 7/0065* (2013.01); *H02J 7/1423* (2013.01); *Y02T 10/7005* (2013.01); *Y02T 10/7055* (2013.01)

(58) Field of Classification Search
USPC .......... 323/304; 320/116, 118, 134, 119, 120, 320/122, 126, 130, 140; 324/433, 426, 429, 324/430, 434
See application file for complete search history.

(56) References Cited

U.S. PATENT DOCUMENTS

| | | | |
|---|---|---|---|
| 7,863,904 B2 * | 1/2011 | Takeda et al. .................. | 324/522 |
| 8,461,808 B2 * | 6/2013 | Ohta et al. ...................... | 320/140 |
| 8,723,480 B2 * | 5/2014 | Lim et al. ....................... | 320/118 |
| 2001/0011881 A1 * | 8/2001 | Emori et al. ................... | 320/116 |
| 2003/0044689 A1 * | 3/2003 | Miyazaki et al. .............. | 429/320 |
| 2003/0107352 A1 | 6/2003 | Downer et al. | |

(Continued)

FOREIGN PATENT DOCUMENTS

| | | |
|---|---|---|
| DE | 102 30 278 | 1/2004 |
| EP | 1 020 973 | 7/2000 |
| EP | 2 104 199 | 9/2009 |

*Primary Examiner* — Edward Tso
*Assistant Examiner* — Alexis A Boateng
(74) *Attorney, Agent, or Firm* — Kenyon & Kenyon LLP

(57) ABSTRACT

An energy supply system including an electrical energy storage system having multiple storage modules, in particular a battery system, an ascertaining device for ascertaining state variables of the storage modules and an energy transmission device for energy transmission between the storage modules and a downstream electrical device. It is provided that the energy transmission device has multiple d.c. chopper converters, which are connected to one another in parallel and/or in series at the output end, and each of the d.c. chopper converters is connectable to a storage module of the energy storage system, and the energy supply system has a trigger device for triggering the d.c. chopper converters as a function of the ascertained state variable of the respective connected storage module. Also described is a method for operating an energy supply system.

15 Claims, 2 Drawing Sheets

(56) References Cited

U.S. PATENT DOCUMENTS

| | | |
|---|---|---|
| 2004/0125618 A1 | 7/2004 | De Rooij et al. |
| 2005/0084745 A1* | 4/2005 | Colello et al. .................. 429/61 |
| 2006/0091857 A1* | 5/2006 | Nakanishi et al. ............ 320/116 |
| 2010/0079146 A1* | 4/2010 | Kurose et al. ................. 324/433 |
| 2012/0256569 A1* | 10/2012 | Kawahara et al. ............ 318/139 |

* cited by examiner

ENERGY STORAGE SYSTEM AND METHOD FOR OPERATING SAME

FIELD OF THE INVENTION

The present invention relates to an energy supply system including an electrical energy storage system having multiple storage modules, in particular a battery system, an ascertaining device for ascertaining state variables of the storage modules and an energy transmission device for energy transmission between the storage modules and a downstream electrical device. The present invention also relates to a method for operating an energy supply system.

BACKGROUND INFORMATION

Such an energy supply system and a method for operating an energy supply system are known from wind power plants, for example, but also from electric drives or hybrid drives of motor vehicles.

To be able to make available the power and energy required for the respective application, storage modules configured as storage cells are connected in series and to some extent also in parallel. A plurality of storage modules is connected in series to achieve the high operating voltage required in the motor vehicle for the electric motor of the electric drive or hybrid drive by adding up the voltage of the individual storage modules configured as storage cells in the electrical energy storage system, i.e., the total voltage of same. The energy storage system is configured, for example, as a battery system having a plurality of battery cells. The high operating voltage may be decoupled from the following energy transmission devices, which are configured as electronic power components such as inverters. Since the total output current of the electrical energy storage system configured as a battery system flows in each of the battery cells in a series connection of the storage modules configured as battery cells, the charge transport taking place through electrochemical processes within the battery cells, the failure of a single battery cell in the extreme case means that the entire configuration is no longer able to provide electrical energy for a downstream electrical device.

An ascertaining device configured as a so-called battery management system is generally used to allow prompt detection of an imminent failure of a battery cell; this system is connected or connectable to both poles of each battery cell and determines such operating parameters as the voltage and temperature of each battery cell at regular or selectable intervals and determines from this at least one state variable such as the state of charge (SOC) of the cell. However, high voltages and/or high currents flow at the poles of the battery cells due to the series connection and/or parallel connection of the cells. This requires a great effort with little flexibility of the electrical operating data of the battery system at the same time.

In addition, the following problems arise for a series connection of a plurality of battery cells to achieve a high total voltage: for different operating states of the device to be operated by the battery, e.g., an electric machine, conditions for the operating voltage to be supplied, the maximum current and the stored energy are formulated, which may be combined only when a larger number of battery cells is linked together than would actually be necessary to meet the requirements. This increases the price as well as the weight and volume of the battery system, which are problematical in particular in an electric automobile. Assembly of the battery system, i.e., connecting the individual cells to one another, takes place at high total voltages of up to 1000 V because of the voltages of the individual battery cells which are added up due to the series connection, which is why a replacement of the battery system, individual cells or modules cannot be carried out in local workshops or in the case of a stationary application it may be carried out only by specially trained personnel using special tools. This results in a high logistical effort for maintenance of battery systems in the event of a defect. In addition, parts of the ascertaining device are in contact with a correspondingly high electric potential. To switch the battery system to be voltage-free, i.e., to separate the actual battery from the load, power circuit breakers, which are typically configured as contactors and are very expensive for the high currents and voltages to be expected here, must be provided.

The object of the exemplary embodiments and/or exemplary methods of the present invention is to introduce an energy supply system and a method for operating such an energy supply system for overcoming the aforementioned disadvantages of the related art.

SUMMARY OF THE INVENTION

This object may be achieved by the features according to the exemplary embodiments and/or exemplary methods of the present invention, as described herein.

The energy transmission device of the energy supply system according to the present invention has multiple d.c. chopper converters, each being connected to one another in parallel and/or in series at the output end, and each d.c. chopper converter (d.c./d.c. converter) being connectable at its inputs to one storage module of the energy storage system, the energy supply system having a trigger device for triggering the d.c. chopper converters as a function of the ascertained state variable of the storage module connected in each case. Due to the modular interconnection, the voltage applied to the input end of the energy transmission device and/or the current flowing through the energy transmission device at the input end may be reduced.

An electrical energy storage system in the exemplary embodiments and/or exemplary methods of the present invention is understood to be an energy storage system having energy storages from which electrical energy may be withdrawn or to which electrical energy may be supplied and then withdrawn. The electrical energy storage is configured as a charge storage and/or as a magnetic energy storage and/or as an electrochemical energy storage. An electrochemical energy storage is in particular a rechargeable battery or an accumulator.

A d.c. chopper converter is understood in particular to be a bidirectional d.c. chopper converter (d.c./d.c. converter). According to an advantageous embodiment of the present invention, it is provided that the d.c. chopper converter may be configured as a flyback converter, as a forward converter, a push-pull converter, a half-bridge converter, a full-bridge converter and a resonance converter. The aforementioned converters are known d.c. chopper converters.

The (total) voltage of each of the storage modules is advantageously in the range of $0.1\ V \leq X \leq 120\ V$, in particular preferably in the range of $0.2\ V \leq X \leq 50\ V$.

Due to the resulting low terminal voltage between the inputs of each of the d.c. chopper converters, a voltage which would necessitate special handling of the battery in exchange for individual energy storage modules or battery cells is not applied to any terminal on the primary side. Since the ascertaining device performs the measurements on the input end of the energy transmission device, this must meet only low safety demands on an energy supply system according to the present invention. The same also applies to the trigger device for triggering the d.c. chopper converters because these are connected in parallel and/or in series with one another only at the output end. The ascertaining device and the trigger device are in particular part of a management system of the energy supply system.

The modular design of the energy transmission device allows the choice of a total voltage which is suitable depending on the operating situation or a total current which is suitable depending on the operating situation. Furthermore, the output voltage is independent of the number of storage cells connected at the primary end. The energy storage system may therefore be configured purely according to energy and power criteria independently of the total voltage required for the respective application.

Another advantage is that expensive power circuit breakers (contactors) for separating the energy storage from the load and for connection to the load may be omitted because the high voltage at the storage output may be shut down easily by shutting down the d.c. chopper converter.

According to an advantageous embodiment of the present invention, it is provided that the trigger device is a trigger device for triggering the d.c. chopper converters as a function of a power requirement of the energy storage system. The trigger device thus has as input variables both the at least one ascertained state variable (based on the respective storage module) and an externally predefined power demand on the energy storage system. The power demand may be a demand for a discharge of electrical energy as well as a demand for a reception of electrical energy.

In general, the state variable is any variable describing the state of the storage modules, but the state variable of the storage modules is preferably a state of charge (SoC) and/or a state of health (SoH) of the respective storage module.

According to another advantageous embodiment of the present invention, it is provided that the ascertaining device has a computation device in which at least one evaluation arrangement, in particular a mathematical model of the storage modules, is stored, the computation device determining the state variables SoC, SoH of this storage medium by comparing at least one measured parameter (module current $I_b$, module voltage $U_b$, module temperature $T_b$) of one of the storage modules with an assigned reference parameter (model current $I_m$, model voltage $U_m$, model temperature $T_m$) of the evaluation arrangement.

The parameter is in particular a module voltage $U_b$ which may be picked up at the respective storage module. The module voltage is obtained from the voltage of the storage cell(s) and their interconnection in the storage module.

The exemplary embodiments and/or exemplary methods of the present invention also relate to a method for operating an energy supply system, in particular an energy supply system as defined above. It is provided that the energy supply system includes an electrical energy supply system having multiple storage modules and an energy transmission device having multiple d.c. chopper converters, the d.c. chopper converters being connected to one another in parallel and/or in series at the output end, each d.c. chopper converter being connected to one storage module of the energy storage system, and for operating the energy supply system, each d.c. chopper converter being triggered at least as a function of an ascertained state variable of the storage module connected to this d.c. chopper converter.

An electrical energy storage system in the present invention is understood to be an energy storage system having energy storages from which electrical energy may be withdrawn or to which electrical energy may be supplied. The electrical energy storage is configured as a charge storage and/or as a magnetic energy storage and/or as an electrochemical energy storage. An electrochemical energy storage is in particular a rechargeable battery or an accumulator.

According to an advantageous embodiment of the present invention, it is provided that the triggering of the d.c. chopper converters also takes place as a function of a power demand on the energy storage system. The triggering, thus takes place as a function of the at least one ascertained state variable (based on the respective storage module) and an externally predefined power demand on the energy storage system. The power demand may be a demand for delivery of electrical energy as well as a demand for receiving electrical energy.

In general, the state variable is every variable describing the state of the storage modules; in particular, the state variable of the storage modules is a state of charge SoC and/or a state of health SoH of the respective storage module.

According to another advantageous embodiment of the present invention, evaluation arrangement, in particular a mathematical model of the storage modules, is provided, the state variable (e.g., SoC, SoH) of this storage module being determined by comparing at least one measured parameter (e.g., module current $I_b$, module voltage $U_b$, module temperature $T_b$) of one of the storage modules with an assigned reference parameter (e.g., model current $I_m$, model voltage $U_m$, model temperature $T_m$) of the evaluation arrangement. The parameter is in particular a module voltage $U_b$, which may be picked up at the respective storage module.

The exemplary embodiments and/or exemplary methods of the present invention are explained in greater detail below on the basis of the illustrations of exemplary embodiments.

DETAILED DESCRIPTION

Figure 1:
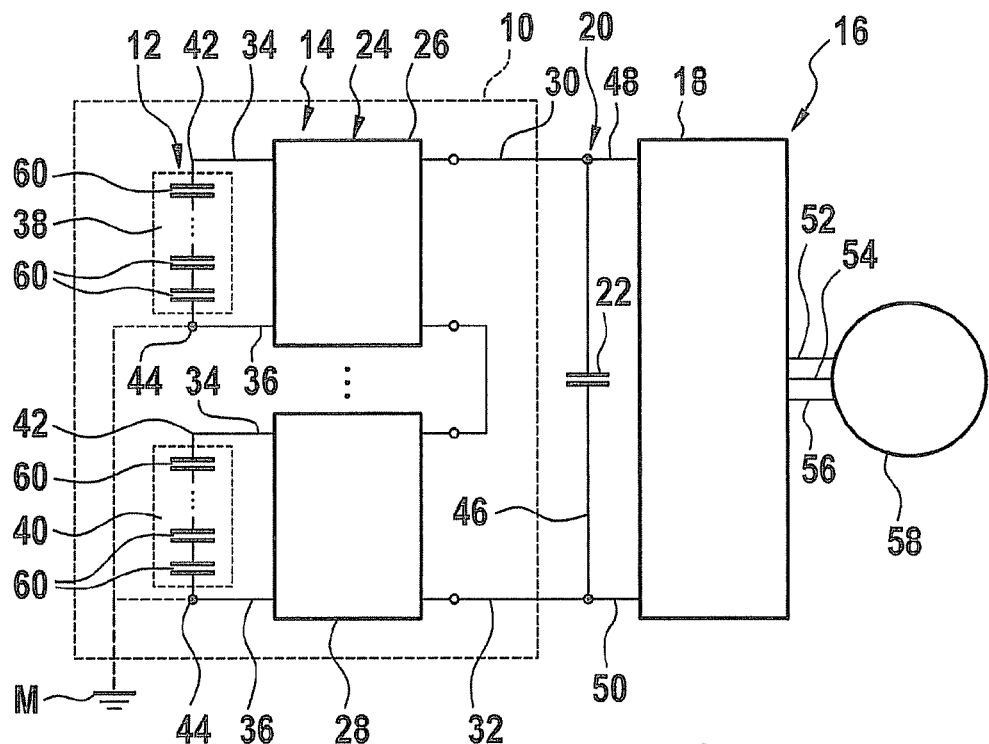
FIG. 1 shows a schematic diagram of a first exemplary embodiment of an energy supply system including an energy storage system and an energy transmission device.

Energy supply system 10 of FIG. 1 has an energy storage system 12, which is configured as a battery system, and an energy transmission device 14. An electrical device 16 having an inverter 18 and a d.c. link 20 is connected between energy transmission device 14 and inverter 18. This d.c. link, having a d.c. link capacitor 22, is connected downstream from energy transmission device 14. Energy transmission device 14 has a d.c. chopper converter module 24, which in turn includes a plurality of d.c. chopper converters 26, 28, only two d.c. chopper converters 26, 28 thereof being shown here. D.c. chopper converters 26, 28 are connected in series at the output end (within d.c. chopper converter module 24), i.e., at the d.c. link end, d.c. chopper converter module 24 having a first and a second module output 30, 32 at the output end. Each d.c. chopper converter (d.c./d.c. converter) 26, 28 is connected electrically via its poles 42, 44 to a storage module 38, 40 of energy storage system 12 via a first and a second input 34, 36. D.c. link capacitor 22 is situated within d.c. link 20 in a current path 46 connecting first and second module outputs 30, 32 and a first and a second inverter input 48, 50.

At its three-phase outputs 52, 54, 56, inverter 18 is connected electrically to an electric machine 58, which is configured as a three-phase machine. Electric machine 58 is in particular an electric machine acting as an electric motor and/or as a generator. Energy supply system 10 is preferably an energy supply system for supplying an electric drive system of a motor vehicle having at least one electric machine 58.

First input 34 of each d.c. chopper converter 26, 28 is at the same electric potential, in particular at ground M (shown here). Each storage module 38, 40 has a plurality of storage cells 60, only three storage cells 60 of which are shown here. Storage modules 38, 40 are in particular lithium ion battery modules (lithium ion accumulator modules) of energy storage system 12, configured as a battery system.

Figure 2:
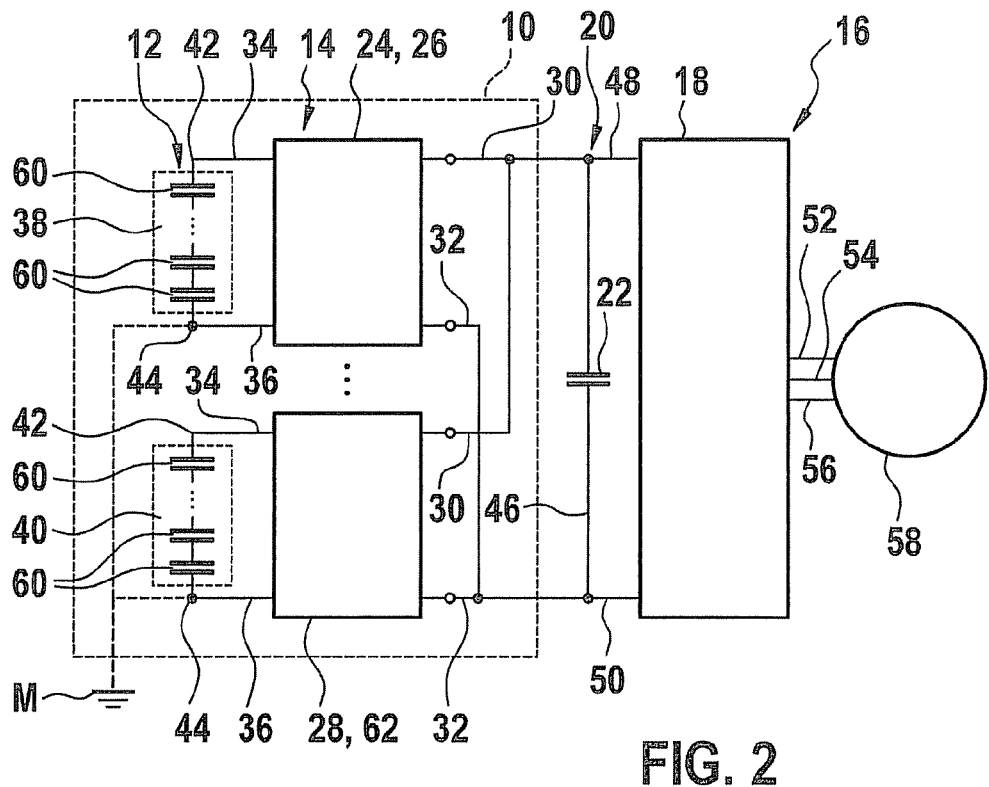
FIG. 2 shows a schematic diagram of a second exemplary embodiment of an energy supply system including an energy storage system and an energy transmission device.

FIG. 2 shows an energy supply system 10 having an energy storage system 12 and an energy transmission device 14, which corresponds essentially to energy supply system 10 in FIG. 1, so that only the differences are discussed here. Energy transmission device 14 of FIG. 2 has two d.c. chopper converter modules 24, 62, each having exactly one d.c. chopper converter 26, 28, d.c. chopper converter modules 24, 62 being connected in parallel with their respective module outputs 30, 32 at the d.c. link end.

In the cases derived directly from the exemplary embodiments in FIGS. 1 and 2, d.c. chopper converters 26, 28 are always connected in series at the output end within assigned d.c. chopper converter modules 24, 62, and d.c. chopper converter modules 24, 62 are always connected in parallel at the output end. Any combination of series connections and/or parallel connections is possible in the general case.

Figure 3:
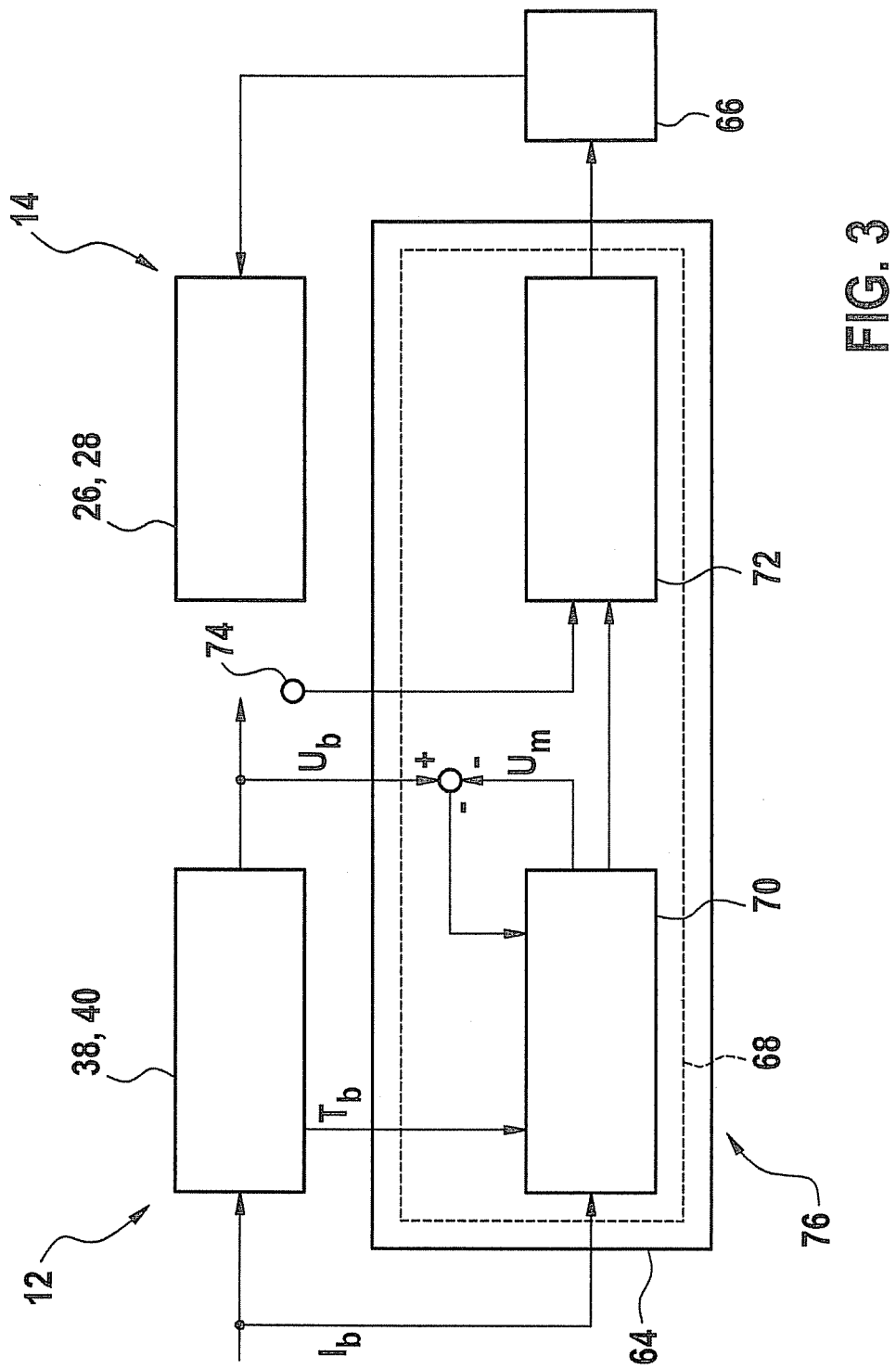
FIG. 3 shows a schematic diagram of the interconnection of an ascertaining device and a trigger device with a d.c. chopper converter of the energy transmission device and a storage module of the energy supply system.

FIG. 3 shows a wiring diagram of an ascertaining device 64 and a trigger device 66 having a d.c. chopper converter 26, 28 of energy transmission device 14 and a storage module 38, 40 of energy supply storage system 12. Ascertaining device 64 has a computation device 68, in which two evaluation arrangements 70, 72, configured as mathematical models of the storage modules 38, 40, are stored. Computation device 68 determines at least one of the state variables of this storage module (38, 40) and the model parameters with the aid of a first evaluation arrangement (model of the storage module with parameter adaptation) 70 by comparing at least one measured parameter of one of storage modules 38, 40, namely module voltage $U_b$, with an assigned reference parameter—here model voltage $U_m$ of first evaluation arrangement 70 and additional measured parameters, namely of module current $I_b$ and module temperature $T_b$.

This state variable and the model parameters are transferred to second evaluation arrangement 72 (model of the storage module for prediction of state) with the aid of which ascertaining device 64 generates, from the state variable and the model parameters together with additional input variables 74, a prediction of the state and/or behavior of assigned storage module 38, 40. Additional input variables 74 describe, for example, operating sequences and boundary conditions of the prediction. The prediction of the state and/or the behavior of assigned storage module 38, 40 is an input variable of trigger device 66, which triggers d.c. chopper converter 26, 28 as a function of the ascertained state variable of the respective connected storage module 38, 40 and a selectable operating strategy. Ascertaining device 64 and trigger device 66 are in particular part of an energy storage management system 76.

In the operational strategy known as "uniform aging," there is a determination by the storage state detection and prediction unit illustrated in FIG. 3, for example—which is part of energy storage management system 76—that one or more cells of a storage module have aged to a greater extent than the cells of other storage modules. In this case, the storage module in question will in the future be involved in the charging and discharging operations to a lesser extent. This is achieved through suitable triggering of the respective d.c. chopper converter, which is connected to the affected storage module at the primary end. In this way, the affected storage module will age further to a lesser extent than the other storage modules and it is possible to induce a state in which the storage modules again have a comparable state of aging and state of health. The degree of freedom necessary to do so, namely to be able to operate the storage modules differently, is provided by the use of the modular d.c. chopper converters.

In an operating strategy of "operation adapted to cell properties (power-optimized operation)" the storage modules may be involved in the charging and discharging operations to different extents as a function of the prevailing power demand on the energy supply system and as a function of the so-called power-to-energy ratio (P/E ratio) of the cells used.

Additional operating strategies are also conceivable. Fundamentally all properties of the energy storage system, which may be influenced by a different mode of operation of the storage modules, may be optimized.

A mode of operation which results in a uniform temperature of the various storage modules shall be given here as the first example. If one storage module has a higher temperature than the other storage modules, it may temporarily be subject to less load than the other storage modules. With a suitable reset of the load, the temperature will therefore adapt itself again to the temperature of the other modules. Conversely, a storage module at a lower temperature may be subjected temporarily to a greater load than the other storage modules to adapt its temperature again to the temperature of the other storage modules.

A mode of operation which results in a uniform average state of charge of the storage modules may be given as the second example. If a storage module has a higher state of charge than the state of charge averaged over all storage modules, it may temporarily be more involved in processes in which a charge is withdrawn from the storage modules and/or it may be less involved in processes in which a charge is supplied to the storage modules. In the opposite sense, this of course also applies to storage modules having a lower state of charge than the state of charge averaged over all storage modules.

In very general terms, the operational strategy for the energy storage system may be based on (storage) models with the optimization of quality criteria. The degree of freedom may be used as a manipulated variable for the optimization so that the storage modules may be operated in different ways, due to the modular d.c. chopper converters used in these cases (this relates to the delivery of electrical energy to the d.c. link and the receipt of electrical energy from the d.c. link).

What is claimed is:
1. An energy supply system, comprising:
an electrical energy storage system having multiple storage modules;
an ascertaining device for ascertaining state variables of the storage modules; and
an energy transmission device for energy transmission between the storage modules and a downstream electrical device;
wherein the energy transmission device has multiple d.c. chopper converters connected to one another in series at the output end, and each of the d.c. chopper converters is connectable at its inputs to one of the storage modules of the energy storage system, wherein the energy supply system has a trigger device for triggering the d.c. chopper converters as a function of the ascertained state variable of a respective connected storage module, and wherein the input of each d.c. chopper converter is at the same electric potential.

2. The energy supply system of claim 1, wherein the trigger device is a trigger device for triggering the d.c. chopper converters as a function of a power demand on the energy storage system.

3. The energy supply system of claim 1, wherein a state variable of the storage modules is at least one of a state of charge and a state of health of the respective storage module.

4. The energy supply system of claim 1, wherein the ascertaining device has a computation device in which at least one evaluation arrangement is stored, the computation device determining the state variable of this storage module by comparison of at least one measured parameter of one of the storage modules with an assigned reference parameter of the evaluation arrangement.

5. The energy supply system of claim 1, wherein the parameter is a module voltage which may be picked up at the respective storage module.

6. A method for operating an energy supply system, the method comprising:
   triggering each one of d.c. chopper converters for operating the energy supply system at least as a function of an ascertained state variable of a storage module connected to the d.c. chopper converter;
   wherein the energy supply system, includes:
      an electrical energy storage system having multiple ones of the storage modules;
      an ascertaining device for ascertaining state variables of the storage modules; and
      an energy transmission device for energy transmission between the storage modules and a downstream electrical device, wherein the energy transmission device has multiple d.c. chopper converters connected in series at the output end and each of the d.c. chopper converters is connectable at its inputs to one of the storage modules of the energy storage system,
   wherein the energy supply system has a trigger device for triggering the d.c. chopper converters as a function of the ascertained state variable of a respective connected storage module, and
   wherein the input of each d.c. chopper converter is at the same electric potential.

7. The method of claim 6, wherein the triggering of the d.c. chopper converters takes place as a function of a power demand on the energy storage system.

8. The method of claim 6, wherein the state variable of the storage modules is at least one of a state of charge and a state of health of the respective storage module.

9. The method of claim 6, wherein the ascertaining device has a computation device in which at least one evaluation arrangement is stored, the computation device determining the state variable of this storage module by comparing at least one measured parameter of one of the storage modules with an assigned reference parameter of the evaluation arrangement.

10. The method of claim 6, wherein the parameter is a module voltage which may be picked up at the respective storage module.

11. The method of claim 6, wherein the ascertaining device has a computation device in which at least one evaluation arrangement, which is a mathematical model of the storage modules, is stored, the computation device determining the state variable of this storage module by comparing at least one measured parameter of one of the storage modules with an assigned reference parameter of the evaluation arrangement.

12. The energy supply system of claim 1, wherein the electrical energy storage system having multiple storage modules is a battery system.

13. The energy supply system of claim 1, wherein the ascertaining device has a computation device in which at least one evaluation arrangement, which is a mathematical model of the storage modules, is stored, the computation device determining the state variable of this storage module by comparison of at least one measured parameter of one of the storage modules with an assigned reference parameter of the evaluation arrangement.

14. The energy supply system of claim 1, wherein the energy transmission device has multiple d.c. chopper converters connected to one another in parallel at the output end, and each of the d.c. chopper converters is connectable at its inputs to one of the storage modules of the energy storage system.

15. The method of claim 6, wherein the energy transmission device has multiple d.c. chopper converters connected in parallel at the output end and each of the d.c. chopper converters is connectable at its inputs to one of the storage modules of the energy storage system.

* * * * *